United States Patent [19]
Ootsuka et al.

[11] Patent Number: 5,114,160
[45] Date of Patent: May 19, 1992

[54] QUENCHING MECHANISM OF SHAFT SEAL FOR SLURRY PUMPS

[75] Inventors: Junji Ootsuka; Youichi Ogata; Keizaburo Nishi, all of Sakado, Japan

[73] Assignee: Eagle Industry Co., Ltd., Japan

[21] Appl. No.: 633,144

[22] Filed: Dec. 24, 1990

[30] Foreign Application Priority Data

Dec. 26, 1989 [JP] Japan .................. 1-149577[U]

[51] Int. Cl.$^5$ ........................................ F16J 15/16
[52] U.S. Cl. ............................... 277/70; 277/67; 277/92
[58] Field of Search ........ 277/92, 82, 237 A, DIG. 4, 277/70, 67, 133, 134, 96.1, 74

[56] References Cited

U.S. PATENT DOCUMENTS 3,940,154 2/1976 Olsson ........................ 277/92
4,881,829 11/1989 Koelsch ..................... 277/92

Primary Examiner—William A. Cuchlinski, Jr.
Assistant Examiner—Daniel G. DePumpo

[57] ABSTRACT

A quenching mechanism for slurry pumps comprises a radial or inclined array of grooves at the rear end of a rotary seal ring. A quenching water, flowing along a fixed seal ring and through a gap between both the seal rings and a baffle sleeve, is forced to flow to the outer periphery of the rotary seal ring by the pumping action of the grooves, thereby achieving an increased cooling effect.

1 Claim, 1 Drawing Sheet

QUENCHING MECHANISM OF SHAFT SEAL FOR SLURRY PUMPS

BACKGROUND OF THE INVENTION

1. Field of the Invention

The present invention relates to an improvement in a shaft seal quenching mechanism used with an airtightly sealed liquid containing much slurry.

2. Prior Art

A slurry seal, as typically shown in FIG. 3, has so far been provided as a shaft seal means to a slurry pump used for pumping up muddy water and other purposes.

As illustrated, the slurry seal comprises a fixed seal ring 103 tightly fitted through a packing 102 into a flange 101 located on the side of a pump casing and a rotary seal ring 108 tightly fitted through a packing 107 into a seal cover 106 secured to a sleeve 105 of a shaft 104. Both the seal rings 103 and 108 slide closely on their respective sliding faces 103a and 108a, thereby preventing a liquid sealed in a sealing space S, which leads to an impeller (not shown), from leaking from around the shaft 104.

When the liquid confined in the sealing space S contains a large amount of slurries of earth and sand or coal dust, neither self-lubrication of the sliding faces 103a and 108a nor self-cooling of both the seal rings 103 and 108 is possible. In this case, a quenching mechanism is conventionally added to the slurry seal for auxiliary lubricating and cooling purposes.

As illustrated in FIG. 3, the quenching mechanism comprises a quenching hole 109 which is open on the side of the packing 102—located between the fixed seal ring 103 and the flange 101—opposite to the sealing space S and a baffle sleeve 110 located between both the fixed seal rings 103, 108 and the sleeve 105 of the shaft 104 and having its one end fixed to an internal end of the flange 101 and its other end extending to the rear end of the rotary seal ring 108. Quenching water fed through the quenching hole 109 to the side 113 of the packing 102 opposite to the sealing space S flows through a path 111 between the baffle sleeve 110 and the seal rings 103, 108 toward the seal cover 106, whence it is discharged through a path 112 between the baffle sleeve 110 and the sleeve 105 to the atmosphere A.

A problem with the above-mentioned conventional quenching mechanism, however, is that the quenching water is discharged into the path 112 before effective cooling is achieved, since it does nothing but to flow through the path 111 along the baffle sleeve 110.

In view of the foregoing, the present invention seeks to provide a quenching mechanism which allows quenching water to be distributed throughout gaps on the side of the fixed seal ring opposite to the sealing space.

SUMMARY OF THE INVENTION

In order to achieve the above-mentioned object, the present invention provides a quenching mechanism comprising a quenching hole which is located on the side of a packing of a fixed seal ring opposite to a sealing space and is open on a flange and a baffle sleeve loosely inserted between both rotary seal rings and said sleeve, having its fixed end secured to said flange and its free end extending to the rear end of the rotary seal ring, wherein the rearmost end of said rotary seal ring or the rearmost end of a metallic retainer fitted over the rear end of said rotary seal ring is provided with a radial or circumferential array of grooves which are deflected in an outward direction and in the direction of rotation opposite to the rotation of said rotary seal ring or said metallic retainer. According to this arrangement, quenching water is fed from the quenching hole to a space located on the side of the packing of the fixed seal ring opposite to the sealing space, and flows through a gap between the seal rings and the baffle sleeve to the rear end of the rotary seal ring. Then, this quenching water is forced to a gap between a seal cover and the rear end of the rotary seal ring or a retainer fitted thereover by the pumping action of a plurality of grooves formed at the rearmost end of the rotary seal ring or retainer fitted thereover. Thus, the quenching water is distributed throughout the surfaces of both the seal rings and the metallic retainers located on the side of both the packings opposite to the sealing space, thus allowing sufficient heat exchange to take place.

BRIEF DESCRIPTION OF THE DRAWINGS

The present invention will now be explained specifically but not exclusively with reference to the accompanying drawings, in which.

DESCRIPTION OF THE PREFERRED EMBODIMENT

Figure 1:
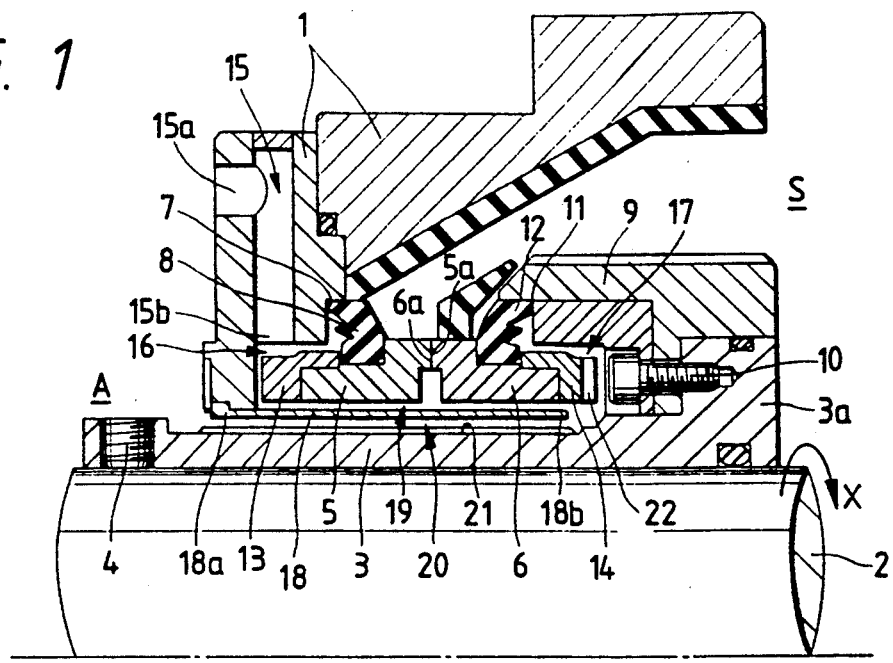
FIG. 1 is a partly sectioned view of one embodiment of the shaft seal quenching mechanism according to this invention.

Referring to FIG. 1, there is shown one preferred embodiment of the shaft seal quenching mechanism according to this invention. A flange 1, fixed to the inside of a pump casing (not shown), receives a shaft 2 therethrough, which is provided to rotate an impeller positioned at the right end of the Figure, although not illustrated, and a sleeve 3 is airtightly inserted over the shaft 2 and fixed in place by a set screw 4.

A shaft seal is located between the flange 1 and the shaft 2 to prevent a slurry-containing liquid from flowing from a space S confined within the pump casing along the shaft into the atmosphere A. As illustrated, this shaft seal includes a fixed seal ring 5 formed of silicon carbide (SiC) having an increased wear resistance and a rotary seal ring 6 again formed of silicon carbide, which comes into axial and opposite sliding contact with the fixed seal ring 5 to define sliding faces 5a and 6a.

An inner periphery of the flange 1 directing to the sealing space S is provided with an annular step 7, and the fixed seal ring 5 is engaged with the step 7 through a packing 8 of elastomers, which supports resiliently the fixed seal ring 5. A seal cover 9 is airtightly inserted over and bolted at 10 onto a collar end 3a—located within the slurry pump arrangement—of the sleeve 3 inserted over the shaft 2. The seal cover 9 is provided at its end in axial opposition to the flange 1 with an annular step 11 in association with the annular step 7. The rotary seal ring 6 is engaged with the annular step 11 through a packing 12 and supports resiliently the rotary seal ring 6 like the packing 8.

Metallic retainers 13 and 14, fitted over the respective rear ends (opposite to the sliding faces 5a and 6a) of both the seal rings 5 and 6, are brought into peripheral engagement with pins (not shown) provided axially into the flange 1 and the seal cover 9, whereby the fixed seal ring 5 is kept against rotation, while the rotary seal ring 6 receives a rotational force from the shaft 2 for rotation.

The packings 8 and 12 serve to maintain airtightness both between the flange 1 and the fixed seal ring 5 and between the seal cover 9 and the rotary seal ring 6 and, at the same time, serve as spring means for urging both the seal rings 5 and 6 against each other through their resiliency to apply the pressure required for sealing to the sliding faces 5a and 6a.

A quenching hole 15 is formed through the flange 1 so as to feed a fresh quenching water from an external reservoir—located above the pump casing (not shown)—therethrough to the shaft seal for lubrication and cooling. The hole 15 includes an upper inlet 15a which is open on the outside of the flange 1 and connected to the reservoir by way of a line (not shown) and a lower outlet 15b which communicates with a space between the metallic retainer 13 for the fixed seal ring 5 and the flange 1, i.e. a gap 16 between the flange 1 and the retainer 13. A baffle sleeve 18, loosely fitted between both the seal rings 5, 6 and the sleeve 3, is secured at its fixed end 18a to the flange 1 within the casing and extends at its free end to the rear end of the rotary seal ring 6. Between both the seal rings 5, 6 and the sleeve 3, the baffle sleeve 18 defines a quenching water path comprising a gap 19 communicating with the lower outlet 15b of the hole 15 and a gap 20 which communicates through the free end 18b with the gap 19 and through which the quenching water is discharged.

The surface of the sleeve 3 facing the baffle sleeve 18 is provided with a spiral groove 21 extending in a direction (e.g., a right-handed screw direction when the shaft 2 rotates in the direction X) adapted to baffle the quenching water which, in association with the rotation of the sleeve 3 integral with the shaft 2, is discharged from the gap 20 between the baffle sleeve 18 and the sleeve 3 into the atmosphere A.

Figure 2:
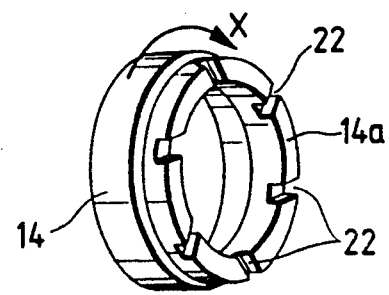
FIG. 2 is a perspective view of part of that embodiment.
Figure 3:
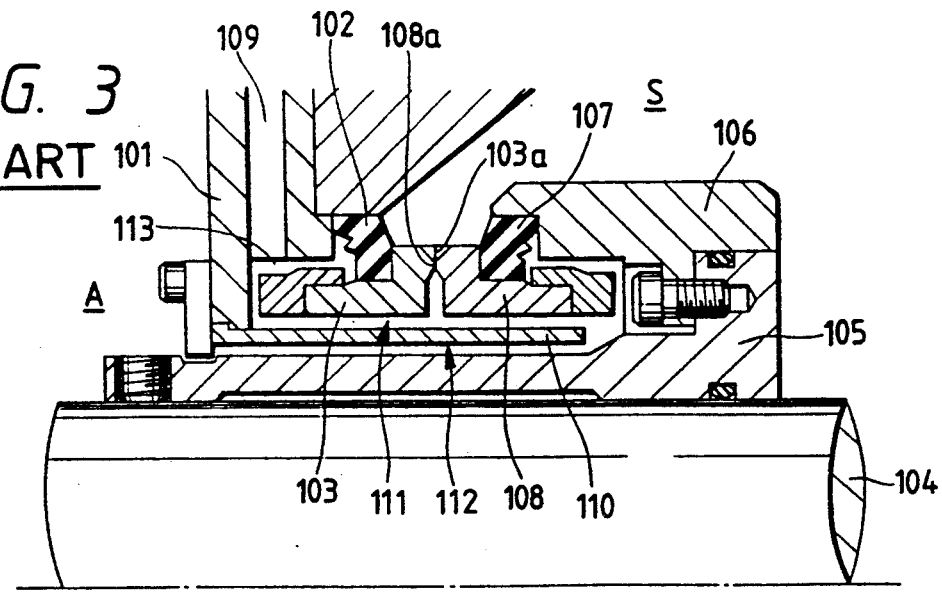
FIG. 3 is a partly sectioned view of a conventional structure.

The metallic retainer 14 fitted over the rear end of the rotary seal ring 6 is provided at its rearmost end 14a with a circumferential array of equidistant grooves 22. As can be seen from FIG. 2, each groove 22 is so deflected in the direction opposite to the rotational direction X that during rotation, it produces a pumping force by centrifugal force and spiral effect, thereby forcing the quenching water to flow outward.

The foregoing embodiment operates as follows.

Quenching water fed from the external reservoir, located above the pump casing, into the quenching hole 15 by potential energy is discharged from the gap 16 through the gaps 19 and 20 into the atmosphere A. According to the instant embodiment, however, the flow of quenching water is properly controlled by the pumping action of the spiral groove 21 on the sleeve 3 or, in other words, the quenching water stays in the pump casing for a while. Thus, a sufficient amount of quenching water is filled within not only the gaps 16 and 19 but also a gap 17 defined by the cover 9 and the retainer 22.

The quenching water, before reaching the gap 20, flows through the gap 19, the fixed seal ring 5, the sliding faces 5a, 6a, the rotary seal ring 6, the rearmost end of the rotary seal ring 6 and a free end 18b of the baffle sleeve 18, and is further forced to flow into the space of the metallic retainer 14, i.e. a gap 17 opposite to the sealing space defined by the packing 12 fitted on the rotary seal ring 6 by the pumping action of the grooves 22 formed on the rearmost end of the metallic retainer 14. In other words, the quenching water flows through a succession of the gaps 16 opposite to the sealing space defined by packing 8 fitted on the rotary seal ring 5, 19 between two seal rings 5, 6 and 17 opposite to the sealing space defined by packing 12 fitted on the rotary seal ring 6 and finally reaches the gap 20, whence it is discharged, thus making it possible to achieve not only a direct cooling effect on the sliding faces 5a and 6a but also an additional cooling effect by heat exchange between the quenching water and the surfaces of both the seal rings 5 and 6 including the surfaces of both the metallic retainers 13 and 14.

In the instant embodiment, the grooves 22 are formed at the rearmost end 14a of the retainer 14. In an embodiment wherein the rotary seal ring 6 is engaged directly with the pin extending from the seal cover 9 not through the retainer 14, however, such grooves 22 may be formed at the rearmost end of the rotary seal ring 6. The action and effect achieved in this case are the same as mentioned just above. Also, sufficient pumping action by centrifugal force is obtained with a radial array of grooves 22.

What is claimed is:

1. A mechanical seal apparatus for a slurry pump comprising:

a rotatable shaft;

a non-rotating sealing ring disposed about said shaft;

a non-rotating annular flange disposed about said shaft and said non-rotating sealing ring;

a first annular elastic packing member positioned in sealing relationship between said non-rotating flange and said sealing ring;

a rotatable sealing ring axially spaced from said non-rotating sealing ring along the axis of said rotatable shaft and disposed about said shaft;

an annular sleeve in sealing relationship with said shaft;

a seal cover fixed to and extending laterally from said annular sleeve;

a second annular elastic packing member positioned in sealing relationship between said seal cover and said rotatable sealing ring;

said non-rotating and rotatable sealing rings having opposed sealing surfaces generally perpendicular to the axis of said shaft and in contact with each other to form a seal therebetween;

a baffle sleeve attached to and supported by said non-rotating annular flange in a manner substantially parallel to said shaft, said baffle sleeve being spaced from each said rotatable and non-rotating sealing rings and said annular sleeve, and having an unsupported end forming a first annular space and said a second annular space which together form a quench fluid path;

said first annular space residing between an outer surface of said baffle sleeve and said rotatable and non-rotating sealing rings, and said second annular space residing between an opposing inner surface of said baffle sleeve and said shaft sleeve;

quench fluid inlet means in said non-rotating annular flange in communication with said first annular space;

quench fluid outlet means in communication with said second annular space;

wherein a rearmost end of said rotatable sealing ring includes a plurality of radial grooves, the direction of said grooves being such as to urge quench fluid in the radial direction of said shaft when said shaft is rotated; and said outer surface of said shaft sleeve including a spiral groove, said groove being oriented to resist the flow of quench fluid in said second annular space.

* * * * *